United States Patent [19]

Maine

[11] Patent Number: 5,673,256
[45] Date of Patent: Sep. 30, 1997

[54] APPARATUS AND METHOD FOR SENDING DATA MESSAGES AT AN OPTIMUM TIME

[75] Inventor: Kristine Patricia Maine, Phoenix, Ariz.

[73] Assignee: Motorola, Inc., Schaumburg, Ill.

[21] Appl. No.: 506,604

[22] Filed: Jul. 25, 1995

[51] Int. Cl.$^6$ .......................... H04B 7/212; H04M 11/00
[52] U.S. Cl. .......................... 370/271; 370/314; 370/322; 370/326; 370/348; 340/825.49; 455/54.1; 379/59; 379/67; 379/90; 379/131; 379/140
[58] Field of Search ..................... 370/271, 310, 370/313, 314, 322, 326, 345, 348, 468, 498; 340/825.44, 825.49; 455/31.1, 33.1, 34.1, 49.1, 54.1; 379/58, 59, 67, 90, 93, 140, 130, 131

[56] References Cited

U.S. PATENT DOCUMENTS

| | | | |
|---|---|---|---|
| 5,394,560 | 2/1995 | Kane | 455/12.1 |
| 5,404,568 | 4/1995 | Yamagishi | 455/12.1 |
| 5,448,759 | 9/1995 | Krebs et al. | 455/54.1 |
| 5,530,918 | 6/1996 | Jasinski | 455/56.1 |

Primary Examiner—Russell W. Blum
Attorney, Agent, or Firm—Gregory J. Gorrie

[57] ABSTRACT

Subscriber units (26) in a satellite communication system (10) send and receive data messages at optimum times. Each subscriber unit (26) has a pre-programmed database that includes a collection of messages (302), such as data (314), fax (316), pre-recorded voice (318), pager (320), or video files (322). Pre-programmed times include low traffic times (404) and/or most economical times (406) at the point of origination and/or destination. Low traffic time information (404) and most economical time information (406) are stored in the subscriber unit (26) and may be updated by the communication system (10). The subscriber unit (26) sends and receives messages at either a pre-programmed or low traffic time (404) or most economical time (406). The satellite communication system (10) calculates message delivery time when different from a user's time zone. A user is notified when a message is sent and received. The subscriber unit (26) stores the messages for future access. The message storage system (55) is reusable in other communication system equipment.

22 Claims, 5 Drawing Sheets

| TRANSMIT SCHEDULE TABLE | | | | | |
|---|---|---|---|---|---|
| TYPE OF MESSAGE | FILE NAME | DESTINATION PHONE NUMBER | SCHEDULING TIME | CONFIRMATION SENT | CONFIRMATION RECEIVED |
| DATA FILE | | | | | |
| FAX | | | | | |
| PRE-RECORDED VOICE | | | | | |
| PAGER MESSAGE | | | | | |
| VIDEO | | | | | |

| PERSONAL PREFERENCES TABLE | |
|---|---|
| PRE-SCHEDULED TIME | 402 |
| LOW TRAFFIC TIME | 404 |
| MOST ECONOMICAL TIME | 406 |
| LOW TRAFFICE TIME AND MOST ECONOMICAL TIME | 408 |
| DEFAULT | 410 |
| PROVIDE TO DESTINATION PARTY IMMEDIATELY | 412 |
| STORE FOR DESTINATION PARTY | 414 |

| RECEIVE SCHEDULE TABLE | | | | | |
|---|---|---|---|---|---|
| TYPE OF MESSAGE | FILE NAME | SUBSCRIBER NAME | RECEIVE TIME | MESSAGE STATUS | STORAGE LOCATION |
| DATA FILE | | | | STORED | 622 |
| FAX | | | | PROVIDED TO DESTINATION PARTY | 624 |
| PRE-RECORDED VOICE | | | | DEFAULT | 626 |
| PAGER MESSAGE | | | | | |
| VIDEO | | | | | |

APPARATUS AND METHOD FOR SENDING DATA MESSAGES AT AN OPTIMUM TIME

TECHNICAL FIELD OF THE INVENTION

The present invention relates generally to communication systems that send and receive messages. More specifically, the present invention relates to satellite communication systems that send and receive pre-programmed messages at low cost times and rates.

BACKGROUND OF THE INVENTION

One problem with using a communication system for transmitting data files or messages is the cost of transmission is high at certain times. The user may not know when low traffic times or the most economical times are in his location or in other destination locations. It may be advantageous for an originating party to delay sending a message for economical reasons or convenience. It may be advantageous for a destination party to delay receiving a message for economical reasons or convenience.

Another problem with using a communication system for transmitting and receiving data files or messages is the speed of transmission. Typically, bandwidth is fixed and limited and large data messages may take a long time to send. Furthermore, it may be advantageous for an originating party to send a message in minimal time. It may be advantageous for a destination party to receive a message in minimal time.

Thus what is needed are a method and apparatus to transmit and receive pre-programmed data files or messages. Moreover, what is needed are a method and apparatus for transmitting and receiving data files or messages at lower costs. What is also needed are a method and apparatus for more efficiently transmitting and receiving data files or messages

BRIEF DESCRIPTION OF THE DRAWINGS

FIG. 4 illustrates a personal preference rules table suitable for use in a preferred embodiment of the present invention.

FIG. 6 illustrates a receive schedule table suitable for use in a preferred embodiment of the present invention.

DETAILED DESCRIPTION OF THE DRAWINGS

The present invention provides, among other things, a system that includes a pre-programmed database with a collection of data files, pager messages, fax messages, or voice messages to be sent at pre-programmed times. The present invention allows a subscriber to send a message(s) at low traffic times (LTT) or the most economical times or both low traffic and most economical times or default times selected by the communication system. In one embodiment, the messages are sent automatically or autonomously by the communication system. The subscriber creates voice messages, fax messages, pager messages, or data file messages, selects a schedule time to be sent, and receives confirmation of sent messages from a subscriber unit.

An advantage of the present invention is that costs of using the communication system are lowered. This is especially beneficial when using the communication system is expensive. A subscriber lowers the cost by using pre-programmed times to send messages. For example, the subscriber schedules a message to be sent at a particular time of day by using pre-programmed times. In another embodiment, the subscriber allows the communication system to calculate the most economical time to send a message. When cost or time of delivery are unimportant to the subscriber, the message may be sent immediately; however, at that instant, the system capacity could be saturated depending on location and time of usage. Under such conditions, the system stores the message and sends it at the first available opportunity freeing the subscriber from manually resending the message until it is delivered. One advantage is the subscriber does not have to take time to access the phone line, as the communication system does it for him automatically. In another embodiment, the communication system preferably notifies the subscriber when the message was sent.

A "satellite" is defined herein to mean a man-made object or vehicle intended to orbit earth and includes both geostationary and orbiting satellites and/or combinations thereof including low earth orbiting (LEO) satellites. A "constellation" is defined herein to mean an ensemble of satellites arranged in orbits for providing specified coverage (e.g., radio communication, photogrammetry, etc.) of portion(s) or all of earth.

Figure 1:
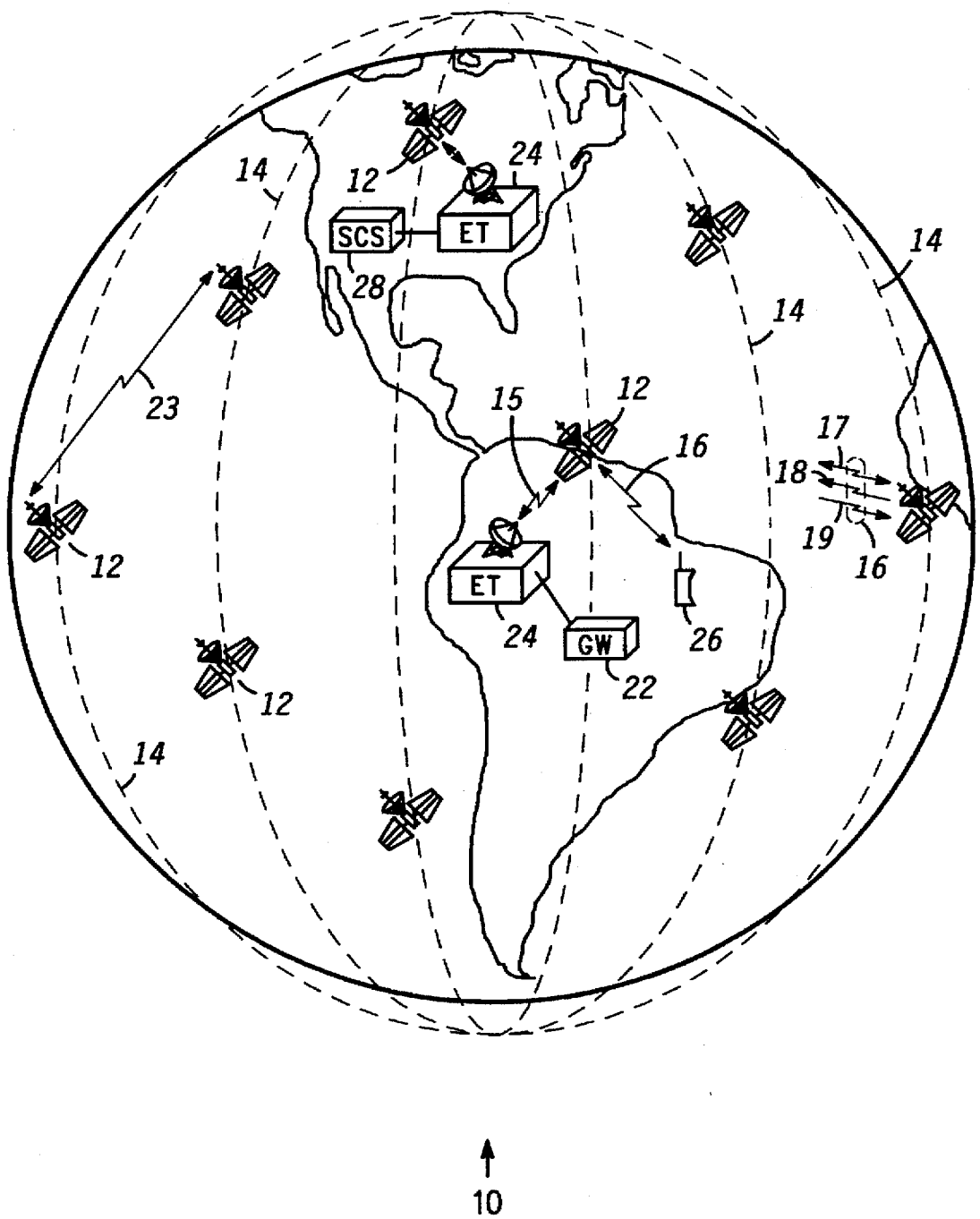
FIG. 1 illustrates a highly simplified diagram of a satellite-based communication system with which the present invention may be practiced.

FIG. 1 illustrates a highly simplified diagram of a satellite-based communication system 10 with which the present invention may be practiced. Communication system 10 uses six polar orbits 14, with each polar orbit 14 holding eleven satellites 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of satellites 12.

For example, each orbit 14 encircles earth at an altitude of around 780 km, although higher or lower orbital altitudes may be usefully employed. Due to the relatively low orbits of exemplary satellites 12, substantially line-of-sight electromagnetic (e.g., radio, light etc.) transmission from any one satellite or reception of signals by any one satellite involves or covers a relatively small area of earth at any instant. For the example shown, satellites 12 travel with respect to earth at around 25,000 km/hr, allowing satellite 12 to be visible to a terrestrial station for a maximum period of circa nine minutes.

Satellites 12 communicate with terrestrial stations which may include some number of radio communication subscriber units (SUs) 26 and earth terminals (ETs) 24 connected to system control segment (SCS) 28. Earth terminals 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. Earth terminals 24 may be co-located with or separate from SCS 28 or GW 22. Earth terminals 24 associated with SCSs 28 receive data describing tracking of satellites 12 and relay packets of control information while ETs 24 associated with GWs 22 only relay data packets (e.g., relating to calls in progress).

Subscriber units 26 may be located anywhere on the surface of the earth or in the atmosphere above the earth. Subscriber units 26 are preferably communications devices capable of transmitting data to and receiving data from satellites 12. By way of example, SUs 26 may be a handheld, portable cellular telephones adapted to communicate with satellites 12. Ordinarily, SUs 26 need not perform any control functions for communication system 10.

Communication system 10 may accommodate any number, potentially in the millions, of subscriber units 26. In the preferred embodiments of the present invention, subscriber units 26 communicate with nearby satellites 12 via subscriber links 16. Subscriber links 16 encompass a limited portion of the electromagnetic spectrum that is divided into numerous channels. Subscriber links 16 are preferably combinations of L-Band frequency channels and may encompass Frequency Division Multiplex Access (FDMA) and/or Time Division Multiple Access (TDMA) communications (infra) or combination thereof. As a minimum, a satellite 12 continuously transmits over one or more broadcast channels 18. Subscriber units 26 synchronize to broadcast channels 18 and monitor broadcast channels 18 to detect data messages which may be addressed to them. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of a satellite 12.

On the other hand, traffic channels 17 are two-way channels that are assigned to particular subscriber units 26 by satellites 12 from time to time.

Satellites 12 communicate with other nearby satellites 12 through cross links 23. Thus, a communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using a subscriber link 16. Alternatively, a communication may be routed down to or up from any of many ETs 24, of which FIG. 1 shows only two, through earth links 15. Earth terminals 24 are preferably distributed over the surface of the earth in accordance with geo-political boundaries. In the preferred embodiments, each satellite 12 may communicate with up to four ETs 24 and over a thousand subscriber units 26 at any given instant.

System control segment 28 monitors the health and status of system communication nodes (e.g., GWs 22, ETs 24 and satellites 12) and desirably manages operations of communication system 10. One or more ETs 24 provide the primary communications interface between SCS 28 and satellites 12. Earth terminals 24 include antennas and RF transceivers and preferably perform telemetry, tracking and control functions for the constellation of satellites 12.

Gateways 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22. With the example constellation of sixty-six satellites 12, at least one of satellites 12 is within view of each point on earth's surface at all times (i.e., full coverage of the earth's surface is obtained). Theoretically, any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

Figures 2, 3:
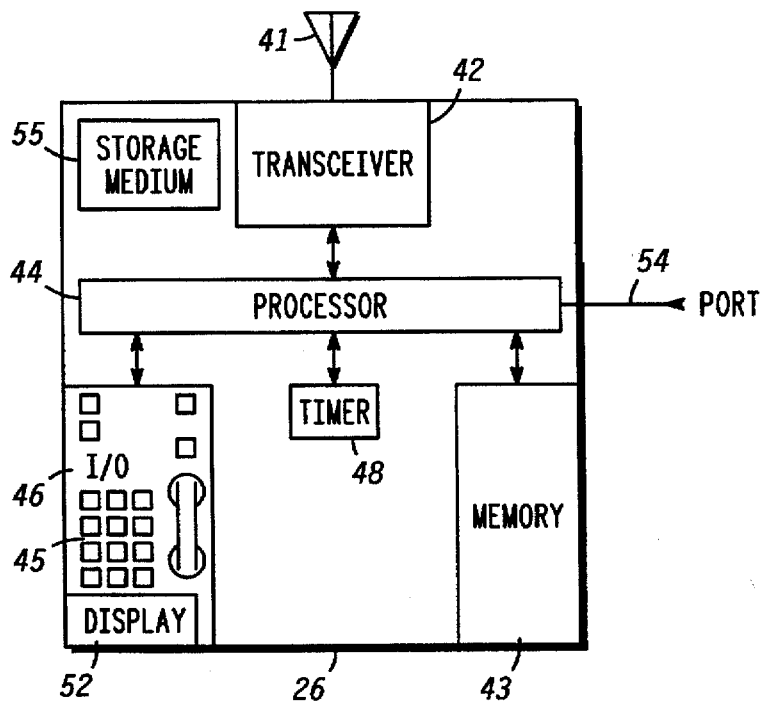
FIG. 2 illustrates a simplified block diagram of a subscriber unit suitable for use in a preferred embodiment of the present invention.
FIG. 3 illustrates a transmit schedule table suitable for use in a preferred embodiment of the present invention.

FIG. 2 illustrates a simplified block diagram of a subscriber unit 26 suitable for use in a preferred embodiment of the present invention. Subscriber unit 26 (analogous to subscriber unit 26 of FIG. 1) communicates with communication system 10, and may also communicate through communication system 10 to other SUs 26 or another telecommunication device. Subscriber unit 26 includes transceiver 42 which transmits and receives signals to and from communication system 10 using antenna 41. Transceiver 42 is desirably a multi-channel transceiver capable of transmitting and receiving on all frequency channels in specified time slots as required by communication system 10.

Transceiver 42 couples to a processor 44, which controls the frequency and timing parameters upon which transceiver 42 operates. In addition, processor 44 preferably controls the power level at which transceiver 42 transmits signals. Additionally, processor 44 desirably couples to input/output (I/O) user interface 46, timer 48, and memory 43. Processor 44 uses timer 48 to maintain the current date and time. Memory 43 includes semiconductor, magnetic, and other storage devices for storing data which serve as instructions to processor 44 and which, when executed by processor 44, cause subscriber unit 26 to carry out procedures which are discussed below. In addition, memory 43 includes variables, tables, and databases that are manipulated during the operation of subscriber unit 26.

Keypad 45 couples to processor 44, memory 43, timer 48, and storage medium 55. Keypad 45 is comprised of alpha-numeric keys suitable for entering data for creating, sending, or receiving data message files via subscriber unit 26.

Display 52 couples to user interface 46. Display 52 may be, but not limited to, a liquid crystal display (LCD), light emitting diode (LED), or cathode ray tube (CRT). Display 52 may be monochrome or color. Display 52 is suitable for displaying data messages.

Subscriber unit 26 includes port 54, which couples to processor 44 in conjunction with timer 48, memory 43, storage medium 55, and transceiver 42. Port 54 is used for input or output of data as discussed below.

Subscriber unit 26 includes storage medium 55, which couples to processor 44. Storage medium 55 includes semiconductor, magnetic, and other storage devices for storing instructions for sending and receiving message files and for storing message files. In one embodiment, storage medium 55 is removable from subscriber unit 26 and can be used in other subscriber units 26. In another preferred embodiment, storage medium 55 is removable and compatible for use in public telephone systems. In another preferred embodiment, storage medium 55 is removable and compatible for use in computer systems. In another preferred embodiment, the information on storage medium 55 is transferred to another subscriber unit 26 using port 54. In another preferred embodiment, the information on storage medium 55 is transferred to a computer system or can be transferred to a device capable of reading and accepting information stored in storage medium 55 through port 54.

FIG. 3 illustrates a transmit schedule table 300 suitable for use in a preferred embodiment of the present invention. Transmit schedule table 300 is located in storage medium 55 (FIG. 2). Transmit schedule table 300 contains a field 302, which indicates the type of message that is stored. For example, field 302 may be comprised of message files such as: data files 314, fax files 316, pre-recorded voice files 318, pager message files 320, or video files 322. The information in field 302, types of messages, is either generated or received by subscriber unit 26 (FIG. 1).

Field 304 is comprised of file names assigned by an originating party to a type of message in field 302. In one preferred embodiment, a subscriber recalls the type of message in field 302 by entering a file name in field 304. In another embodiment, a subscriber recalls the type of message in field 302 by accessing field 304 and reading the file name(s). A type of message in field 302 can be appended, edited, modified, deleted, or rerouted by the subscriber using subscriber unit 26 (FIG. 1) or another device, such as a computer, using port 54 (FIG. 2). A destination party can also append, edit, modify, or reroute a data message received from transmit schedule table 300 using subscriber unit 26 (FIG. 1) or another device, such as a computer, using port 54 (FIG. 2). Destination phone number in field 306 is the desired number to which subscriber unit 26 (FIG. 1) sends a data message. Transmit schedule table 300 also includes scheduling time in field 308 which is the preferred time the subscriber wants to send a message. Each message may be associated with a preferred send time. The preferred time is entered manually by a subscriber or calculated by subscriber unit 26 (FIG. 1). The preferred send time can be immediate or delayed.

A confirmation that a message was sent is recorded in field 310. When type of message in field 302 is sent to a destination subscriber unit 26 (FIG. 1), a confirmation sent indication is stored in field 310. In one preferred embodiment, a subscriber accesses field 310 and reads an alpha-numeric display 52 (FIG. 2) of an indication that a particular message(s) was sent. In another preferred embodiment, a subscriber accesses field 310 and views an iconic display 52 (FIG. 2) indicating a particular message(s) was sent. In another preferred embodiment, subscriber unit 26 (FIG. 1) emits an audio tone indicating a particular message(s) was sent. In another preferred embodiment, subscriber unit 26 (FIG. 1) emits a visual signal, for example a steady or flashing light, indicating a particular message(s) was sent. In another preferred embodiment, subscriber unit 26 (FIG. 1) emits a vibrational signal indicating a particular message(s) was sent. In another preferred embodiment, subscriber unit 26 (FIG. 1) displays a video image indicating a particular message(s) was sent. Preferably, a subscriber has the option of choosing the method for indicating when a message(s) was sent, as described above, or the subscriber chooses any combination of methods, or chooses no indication of message(s) sent.

Confirmation that a message was received by the destination party is recorded in field 312. When type of message from field 302 is received, an indication the message was received is stored in field 312. The indicators in field 312 are provided by communication system 10 (FIG. 1). In one preferred embodiment, a subscriber accesses field 312 and reads an alpha-numeric display 52 (FIG. 2) indicating a particular message(s) was received. In another preferred embodiment, a subscriber accesses field 312 and views an iconic display 52 (FIG. 2) indicating a particular message(s) was received. In another preferred embodiment, subscriber unit 26 (FIG. 1) emits an audio tone indicating a particular message(s) was received. In another preferred embodiment, subscriber unit 26 (FIG. 1) provides a visual signal, for example a steady or flashing light, indicating a particular message(s) was received. In another preferred embodiment, subscriber unit 26 (FIG. 1) displays a video image indicating a particular message(s) was received. In another preferred embodiment, subscriber unit 26 (FIG. 1) emits a vibrational signal indicating a particular message(s) was received. Preferably, a subscriber has the option of choosing the method for indicating when a message(s) was received, as described above, or the subscriber chooses any combination of methods, or chooses no method for indicating message(s) received.

FIG. 4 illustrates a personal preferences table 400 suitable for use in a preferred embodiment of the present invention. Scheduling time in field 308 (FIG. 3) is preferably provided by personal preferences table 400. Pre-scheduled time option 402 is selected by a subscriber and is based on the subscriber's personal preference(s) for sending a message at a certain time and/or under certain conditions. Preferably, subscriber unit 26 (FIG. 2) automatically calculates time of transmission for a destination time zone when pre-scheduled time option 402 is selected and the destination time zone of a message is different from originating time zone.

Low traffic time (LTT) option 404 is preferably low usage time of communication system 10 (FIG. 1) based on demand for communication services. In one preferred embodiment, LTT option 404 is the low traffic time where a subscriber is located. In another preferred embodiment, LTT option 404 is low traffic time where a destination party is located. In another preferred embodiment, low traffic time option 404 is average or some combination of low traffic usage of the subscriber's and destination party's locations.

Most economical time (MET) option 406 is typically when communication rates are low. For example, communication rates include, but not limited to, phone call rates and data transmission rates. An example of MET option 406 would be between midnight and 6:00 a.m. In one preferred embodiment, MET option 406 is the most economical time where an originating subscriber is located. In another preferred embodiment, MET option 406 is the most economical time where a destination party is located. In another preferred embodiment, most economical time option 406 is the average or some combination of most economical times of the subscriber's and destination party's locations.

Low traffic time option 404 and most economical time option 406 are not necessarily the same times, but could be. Low traffic time information 404 and most economical time information 406 are preferably provided by communication system 10 (FIG. 1). Preferably, a subscriber chooses a combination low traffic time and most economical time option 408 and subscriber unit 26 (FIG. 2) calculates a time for sending the message. In another preferred embodiment, the subscriber chooses default option 410 and subscriber unit 26 (FIG. 2) calculates an optimum time to send a message(s) based on pre-programmed system parameters and variables that may be provided by communication system 10 (FIG. 1).

A subscriber selects option 412, provide to destination party immediately, to transmit a message immediately. Subscriber unit 26 (FIG. 1) immediately attempts to provide the data message through communication system 10 (FIG. 1) to a destination subscriber unit 26 (FIG. 1).

A subscriber selects option 414, store for destination party, to transmit a message and have it stored in a destination subscriber unit 26 (FIG. 1) rather than be delivered immediately. Preferably, subscriber unit 26 (FIG. 2) automatically calculates time of delivery for destination time zone when option 414 is selected by a subscriber and destination time zone of a message is different from originating time zone. Preferably, a subscriber may select option 402, 404, 406, 408, or 410 additionally when selecting option 414.

Figure 5:
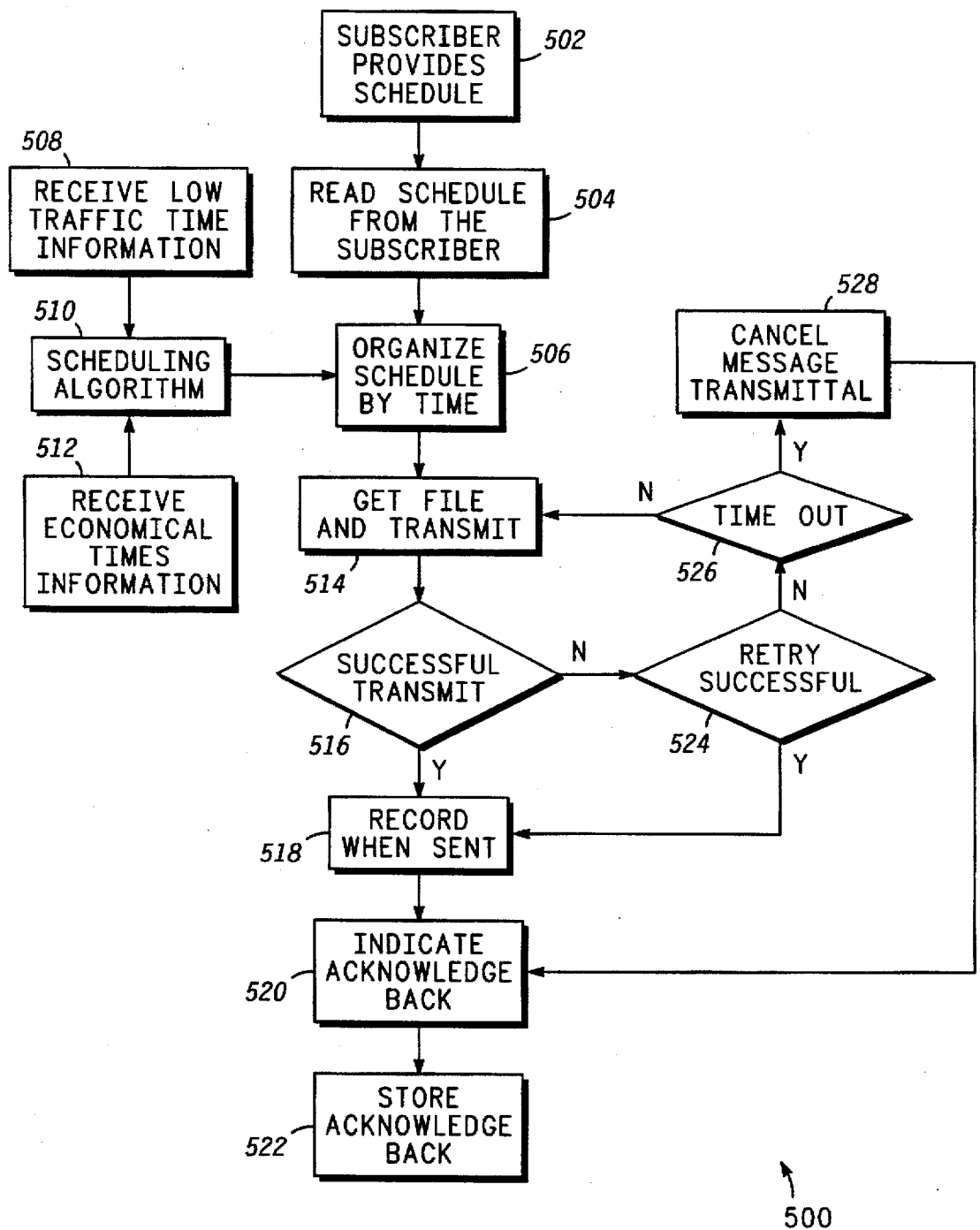
FIG. 5 illustrates a simplified diagram of a procedure for transmitting a pre-programmed message to a receiving party for use in a preferred embodiment of the present invention.

FIG. 5 illustrates a simplified diagram of procedure 500 for transmitting a pre-programmed message to a destination party for use in a preferred embodiment of the present invention. In the preferred embodiment, transmit procedure 500 is performed by processor 44 (FIG. 2) in conjunction with timer 48, memory 43, storage medium 55, and transceiver 42. In task 502, a schedule is input via keypad 45 (FIG. 2) or port 54 (FIG. 2). A schedule may include type of message from field 302 (FIG. 3), file name from field 304 (FIG. 3), destination phone number from field 306 (FIG. 3), or scheduling time from field 308 (FIG. 3). A schedule may be associated with a personal preference send time option of personal preferences table 400, such as pre-scheduled time option 402 (FIG. 4), low traffic time option 404 (FIG. 4), most economical time option 406 (FIG. 4), low traffic time and most economical time option 408 (FIG. 4), default option 410 (FIG. 4), provide to destination party immediately option 412 (FIG. 4), or store for destination party option 414 (FIG. 4). In a preferred embodiment, a subscriber provides a schedule using subscriber unit 26 (FIG. 2). In another embodiment, a subscriber provides a schedule using subscriber unit 26 (FIG. 2) with a computer, fax machine, or other device via port 54 (FIG. 2). Each individual subscriber may have his/her own schedule or multiple schedules and should assign a unique file name in field 304 (FIG. 3) to each type of message file in field 302 (FIG. 3). Task 504 reads from a schedule provided in task 502. In one embodiment of the present invention, task 508 receives low traffic time information provided by communication system 10 (FIG. 1). Low traffic time includes a schedule of times where demand for communication services is projected to be low. The low traffic time information received in task 508 may include low traffic times for the present location of the subscriber unit 26 (FIG. 1), as well as low traffic times for other locations served by communication system 10 (FIG. 1). Preferably, task 508 provides low traffic times for all locations communication system 10 (FIG. 1) serves. Desirably, the low traffic times provided are defined for either local area codes or longitude and latitude locations.

In one embodiment of the present invention, task 512 receives most economical time (MET) information provided by communication system 10 (FIG. 1). Most economical time includes a schedule of times where demand for communication services is projected to be low. The MET information received in task 512 may include most economical times for the present location of the a subscriber unit 26 (FIG. 1), as well as most economical times for other locations served by the communication system 10 (FIG. 1). Preferably, task 512 provides most economical times for all locations communication system 10 (FIG. 1) serves. Desirably, the most economical times provided are defined for either local area codes or longitude and latitude locations. Most economical time information is typically when communication rates are low.

Low traffic times and/or most economical times may be provided manually or received automatically by a subscriber selection from personal preferences table 400 into field 308 (FIG. 3). In one preferred embodiment, LTT information and/or MET information from communication system 10 (FIG. 1) are received when subscriber unit 26 (FIG. 1) is turned on. In another embodiment, LTT and MET information is received on a regular basis by subscriber unit 26 (FIG. 1). In another embodiment, when subscriber unit 26 (FIG. 1) is turned on, LTT and MET information is preferably updated automatically via gateway 22 (FIG. 1). In another preferred embodiment, subscriber unit 26 (FIG. 1) requests low traffic time information and/or most economical time information. In another preferred embodiment, low traffic time and most economical time information for a destination of a destination party is updated automatically via gateway 22 (FIG. 1) when subscriber unit 26 (FIG. 1) transmits a destination phone number from field 306 (FIG. 3). In another embodiment, subscriber unit 26 (FIG. 1) requests LTT information and MET information for a destination of a destination party, for example, by transmitting a destination phone number from field 306 (FIG. 3) or a pre-determined location code. Examples of pre-determined location codes include area codes, country codes, city codes, and longitude/latitude data.

Low traffic time information and most economical time information are preferably generated in gateway 22 (FIG. 1). Once low traffic time information and/or most economical time information is received, task 510 calculates low traffic and/or most economical time for the message(s) to be sent. Based on subscriber preference selected in personal preferences table 400 (FIG. 4), task 506 associates low traffic time information and/or most economical time information with a type of message in field 302 (FIG. 3) identified by file name in field 304 (FIG. 3). Task 506 organizes a schedule provided from task 502 by time to be sent based on low traffic time information and/or most economical time information received from task 510.

When the appropriate time to send a message is detected, task 514 retrieves a file(s) and transmits it to a destination subscriber unit 26 (FIG. 1). Task 514 also transmits a subscriber's personal preference of provide to destination party immediately option 412 (FIG. 4) or store for destination party option 414 (FIG. 4). A subscriber initiates a message transmittal by requesting access to communication system 10 (FIG. 1). Message transmission may be accomplished similarly to a cellular phone call. Destination phone number 306 (FIG. 3) is entered by a subscriber into subscriber unit 26 (FIG. 2). A subscriber selects type of message from field 302 (FIG. 3), assigns a unique file name in field 304 (FIG. 3) to message file in field 302 (FIG. 3), and schedules the time to send the message in field 308 (FIG. 3).

In one embodiment of the present invention, in response to task 514, communication system 10 (FIG. 1) locates the destination subscriber unit 26 (FIG. 1) (i.e., using ring alerts) and assigns a communication channel to the destination subscriber unit 26 (FIG. 1). The communication channel may be a one-way down-link or a two-way channel. The transmitting subscriber unit 26 (FIG. 1) preferably sends a destination phone number from field 306 (FIG. 3) along with associated message information (referenced above) to originating satellite 12 (FIG. 1).

As part of task 514, in one embodiment of the present invention, when a subscriber unit 26 (FIG. 1) requests access to communication system 10 (FIG. 1), the subscriber unit 26 (FIG. 1) provides the communication system 10 (FIG. 1) with the type of message (field 302, FIG. 3) to be sent. The access request may also include file size. Based on the type of message, communication system 10 (FIG. 1) allocates a channel bandwidth. For example, a very large data file would be allocated a large bandwidth, while small message files would be allocated less bandwidth. In the preferred embodiment, an allocation of more bandwidth would include additional time slots of a particular frequency channel, or additional time slots of several frequency channels. The amount of bandwidth allocated may also be based on other factors including availability of communication channels and demand for services.

Task 516 determines if a data message was transmitted successfully in task 514. If the transmittal is unsuccessful, task 524 is performed. In task 524 the data message is provided for a pre-determined number of retries. Examples of unsuccessful transmittals include destination subscriber unit 26 (FIG. 1) in use or busy, communication system 10 (FIG. 1) disallows access to the system, or originating subscriber unit 26 (FIG. 1) not working correctly. In one preferred embodiment, the pre-determined number of retries is selected by a subscriber. In another preferred embodiment, the pre-determined number of retries is a default set by subscriber unit 26 (FIG. 1) and/or communication system 10 (FIG. 1).

When a retry is unsuccessful, but less than the pre-determined number of retries, task 526 provides the message to task 514. Task 514 transmits the message again. Task 516 determines if the transmittal is successful or not. If task 516 determines the transmittal is unsuccessful, task 524 retries the transmittal. This loop preferably continues until task 524 determines a successful retry or task 526 determines a time-out.

If task 516 successfully transmits a message or task 524 determines a retry is successful, task 518 preferably records the time the successfully transmitted message is sent. After task 518, task 520 sends an indication that a message was sent. Task 522 preferably stores an indication in field 310 (FIG. 3) that a message was transmitted.

If task 524 determines that a retry is unsuccessful and reaches the number of pre-determined retries, task 526 times out the message transmittal. Task 528 cancels the message transmittal. Once a message transmittal is canceled by task 528, task 520 preferably sends an indication to task 522 that the message was canceled. Task 522 stores an indication of the canceled message transmittal in field 310 (FIG. 3). An indication stored in field 310 (FIG. 3) may provide a subscriber with visual alpha-numeric or iconic or video display 52 (FIG. 2), audio tone, visual signal, or vibrational signal.

FIG. 6 illustrates receive schedule table 600 suitable for use in a preferred embodiment of the present invention. Receive schedule table 600 is preferably located in storage medium 55 (FIG. 2). Receive schedule table 600 records messages received by a subscriber unit 26 (FIG. 1) in field 602. Type of message is provided by an originating subscriber unit 26 (FIG. 1) in field 302 (FIG. 3). Field 602 lists the type of message files, such as: data files 604, fax files 606, pre-recorded voice files 608, pager message files 610 or video files 612.

Field 614 is where a file name of a message is stored. The name of a subscriber originating a message is recorded in field 616. The time when a message is received is recorded in field 618 by subscriber unit 26 (FIG. 2) preferably using a time provided by timer 48 (FIG. 2).

A message status indicator(s) in field 620 is preferably received from personal preferences table 400. Message status field 620 includes indicators, such as: a message stored indicator 622, a provided to destination party indicator 624, or a default indicator 626. Stored indicator 622 may be associated with store for destination party option 414 (FIG. 4). Provided to destination party indicator 624 may be associated with provide to destination party immediately option 412 (FIG. 4). Default indicator 626 may be associated with default option 410 (FIG. 4). A received message file with an associated message status in field 620 of stored indicator 622 or default indicator 626 is preferably stored upon receipt in storage medium 55 (FIG. 2) of destination subscriber unit 26 (FIG. 2).

Storage location field 628 is preferably the location in storage medium 55 (FIG. 2) of destination subscriber unit 26 (FIG. 1) of received message files identified in field 602. When a message is stored in storage medium 55 (FIG. 2), a storage location in field 628 is associated with file name in field 614, subscriber name in field 616, and receive time in field 618. In one preferred embodiment, a destination party enters one or more fields of receive schedule table 600 into subscriber unit 26 (FIG. 2) for retrieving a message. Fields entered from receive schedule table 600 are comprised of: file name field 614 and/or subscriber name field 616 and/or receive time field 618. A stored message associated with an entered field at associated storage location from field 628 preferably is retrieved. In another preferred embodiment, a destination party peruses a list of file names in field 614 and/or subscriber names in field 616 and/or receive times in field 618 and selects an associated message for retrieval preferably located at an associated storage location in field 628.

Figure 7:
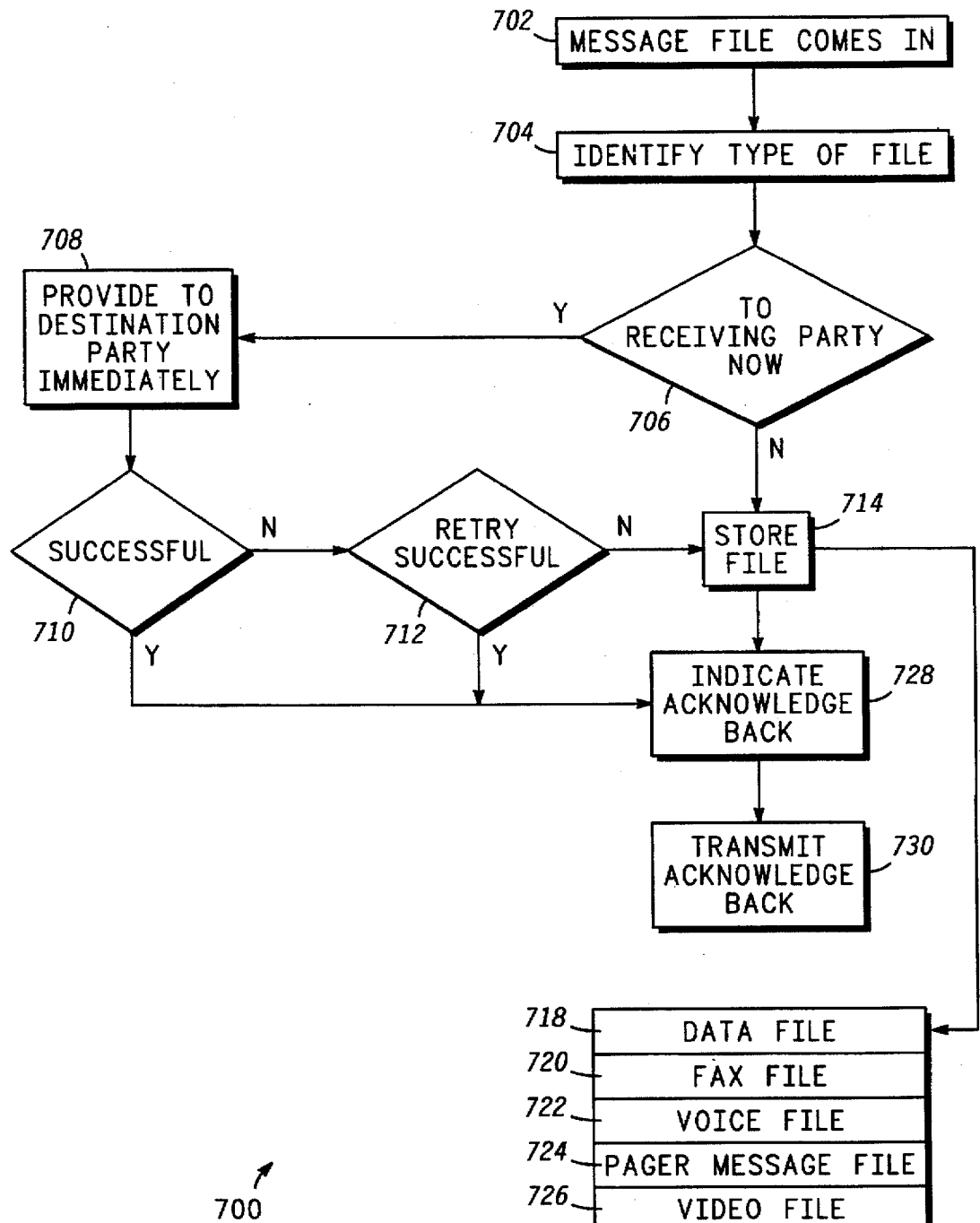
FIG. 7 illustrates a simplified diagram of a procedure for receiving a pre-programmed message transmitted for use in a preferred embodiment of the present invention.

FIG. 7 illustrates a simplified diagram of procedure 700 for receiving a pre-programmed message transmitted for use in a preferred embodiment of the present invention. In the preferred embodiment, receive procedure 700 is performed by processor 44 (FIG. 2) in conjunction with timer 48 (FIG. 2), memory 43 (FIG. 2), storage medium 55 (FIG. 2), and transceiver 42 (FIG. 2). Subscriber unit 26 (FIG. 1) sends a message file using transmit procedure 500 (FIG. 5). The message file is received using receive procedure 700. Receive procedure 700 is capable of autonomously accepting an incoming message file and placing the message file in storage as a data file, fax file, voice file, pager message, or video file and recording the storage location.

Task 702 preferably accepts a message file transmitted by transmit procedure 500 (FIG. 5). To accept a message file, subscriber unit 26 (FIG. 1) monitors broadcast channels 18 (FIG. 1) to detect messages which may be addressed to them. Subscriber unit 26 (FIG. 1) preferably answers a page or responds to a ring-alert on broadcast channel 18 (FIG. 1). Communication system 10 (FIG. 1) assigns subscriber unit 26 (FIG. 1) a communication channel to lock on to for message communication. In one preferred embodiment, communication system 10 (FIG. 1) preferably locates destination subscriber unit 26 (FIG. 1). Communication system 10 (FIG. 1) preferably assigns traffic channel 17 (FIG. 1) to destination subscriber unit 26 (FIG. 1). In another preferred embodiment, rather than a two-way traffic channel, a one-way channel is assigned by communication system 10 (FIG. 1). Subscriber unit 26 (FIG. 1) receives a message on the assigned channel. In one embodiment of the present invention, communication system 10 (FIG. 1) allocates channel bandwidth based on the type of message (from field 302 (FIG. 3) transmitted by an originating subscriber unit 26 (FIG. 1)) or the size of the message file or data file. For example, a very large data file would be allocated a large bandwidth, while small message files would be allocated less bandwidth. In the preferred embodiment, an allocation of more bandwidth would include additional time slots of several frequency channels. The amount of bandwidth allocated may also be based on other factors including availability of communication channels and demand for services.

After task 702 receives a message file from communication system 10 (FIG. 1), task 704 identifies the type of message as indicated in field 302 (FIG. 3). For example, the message may be identified as a data file 314 (FIG. 3), fax file 316 (FIG. 3), pre-recorded voice file 318 (FIG. 3), pager message file 320 (FIG. 3), or video file 322 (FIG. 3).

Task 706 determines if a message is to be provided immediately to a subscriber by task 708 or stored by task 714 in field 716. Task 706 determines providing and/or storing based on message status information preferably received from field 620 (FIG. 6).

If task 706 determines a message is to be provided immediately, task 708 provides the message immediately. Subscriber unit 26 (FIG. 2) preferably indicates a message provided immediately by a tonal or visual indicator. If task 706 determines a message is not to be provided to a destination party immediately, task 714 stores the message in field 716 preferably located in storage medium 55 (FIG. 2) of destination subscriber unit 26 (FIG. 1). Based on the type of message file provided from task 704, task 714 preferably stores the message in field 716 appropriately as a data file 718, fax file 720, voice file 722, pager message file 724, or video file 726.

If task 710 determines a message was not provided successfully (i.e., the destination party does not answer or accept the message), task 712 retries providing the message. Task 712 preferably uses pre-determined time intervals when retrying until a pre-determined time-out or number of retries is reached. In one preferred embodiment, a user chooses pre-determined time intervals and/or a pre-determined time out and/or pre-determined number of retries. In another embodiment, subscriber unit 26 (FIG. 1) defaults to pre-determined system retry time intervals and/or time outs and/or number of retries.

If task 712 determines retries are unsuccessful, received message file from field 602 (FIG. 6) is preferably stored by task 714 in field 716 appropriately as data file 718, fax file 720, voice file 722, pager message 724, or video file 726.

If task 710 determines a message was provided successfully (i.e., the destination party accepts or answers the message immediately), or if task 712 determines a retry was successful or if task 714 stores a message file in field 716, task 728 indicates an acknowledgment back to a originating party that a message was received should be transmitted. Task 730 transmits an indication of acknowledgment to the originating subscriber unit 26 (FIG. 1) provided by task 728. Preferably, the originating subscriber unit 26 (FIG. 1) stores this acknowledgment in field 312.

While the invention has been described in terms of specific examples and with specific preferred embodiment, it is evident that many alternatives and variations will be apparent to those skilled in the art based on the description herein, and is intended to include such variations and alternatives in the claims.

As described herein, the advantages of the present invention will be apparent to those of skill in the art and provide improved methods of operating various parts of a communication system. These advantages include an improved method for sending and receiving data messages. An advantage to the present invention is that a subscriber unit is provided which is capable of accomplishing several functions without reliance on other devices. Functions include the transmission and reception of data files, fax files, voice files, video files, and pager messages. Another advantage to the present invention is that information, such as data files, fax files, voice files, video files, or pager files, are sent and received automatically.

Another advantage to the present invention is that a user can save money by sending or receiving messages at low traffic times. Another advantage to the present invention is that a user can save money by sending or receiving messages at most economical times. Another advantage to the present invention is that updates can be requested from the communication system for low traffic times and most economical times on demand. Another advantage to the present invention is that a user can choose when to send or receive messages based on cost of using communication system. Another advantage to the present invention is that time can be saved by automatically sending or receiving messages at pre-determined times.

Another advantage to the present invention is that outgoing data messages can be delayed until more convenient or cost effective times or transmitted immediately. Another advantage to the present invention is that incoming data messages can be stored immediately in the subscriber unit until a destination party desires to access the message(s) or received immediately.

Another advantage to the present invention is that a storage medium can be used in other subscriber units for storing, receiving, or retrieving data messages. Another advantage to the present invention is that data messages received by subscriber unit can be stored an manipulated in an interfacing device such as a computer Another advantage to the present invention is that bandwidths may be allocated according to message type, or the size of a message.

What is claimed is:

1. A method of sending a data message from a subscriber unit comprising the steps of:

receiving updates from a communication system at said subscriber unit, said updates including an optimum time for transmission of data messages;

reading said data message and a set of personal preferences from a memory in said subscriber unit, said set of personal preferences indicating whether to transmit said data message at a pre-scheduled time or at said optimum time; and transmitting by said subscriber unit, said data message during said pre-scheduled time or said optimum time depending on said set of personal preferences.

2. A method as claimed in claim 1 wherein the receiving step includes the step of receiving said updates, wherein said updates include said optimum time for each of a plurality of geographic locations served by said communication system, and wherein the method further comprises the steps of:

storing said updates in a second memory of said subscriber unit;

determining a geographic location of said subscriber unit; and evaluating said updates to determine said optimum time for said geographic location of said subscriber unit.

3. A method as claimed in claim 2 wherein the reading step further comprises the step of reading a destination location for said data message, and wherein said method further comprises the step of evaluating said updates to determine one of said optimum times for receipt of said data message to said destination location, and wherein the transmitting step comprises the step of transmitting said data message for receipt to said destination location at said one of said optimum times.

4. A method as claimed in claim 3 wherein said optimum times include most economical times for said plurality of geographic locations, said most economical times including cost information, and wherein the method further comprises the step of comparing a most economical time for said destination location and a most economical time for said geographic location of said subscriber unit to determine a lowest cost transmit time, and wherein the transmitting step further comprises the step of transmitting said data message at said lowest cost transmit time.

5. A method as claimed in claim 2 wherein said data message is associated with a message type, and wherein the method further comprises the steps of:

requesting a communication channel from said communication system wherein the requesting step includes the step of transmitting said message type to said communication system; and receiving an assignment of said communication channel, said communication channel having a bandwidth based on said message type, said communication channel assigned by said communication system.

6. A method as claimed in claim 5 wherein said communication channel includes a plurality of time slots within time division multiplexed (TDM) frames, and wherein said bandwidth is based on a number of said time-slots allocated per each of said TDM frames.

7. A method of sending a data message using a subscriber unit comprising the steps of:

reading a schedule and a set of personal preferences, said schedule including said data message, said set of personal preferences indicating a subscriber preferred send time for said data message, said subscriber preferred send time indicating whether to transmit said data message at a pre-scheduled time, a most economical time, or a low traffic time;

organizing said schedule by the subscriber preferred send time;

transmitting said message at said subscriber preferred send time;

receiving updates from a communication system, said updates including either low traffic times or economical times for transmission of said data message using said communication system; and storing said updates within said subscriber unit.

8. A method as claimed in claim 7 further comprising the step of confirming the step of transmitting said data message when transmitted at said subscriber preferred send time.

9. A method as claimed in claim 8 further comprising the steps of:

receiving from said communication system a confirmation that said data message was received by a destination subscriber unit; and displaying the confirmation for said data message.

10. A method as claimed in claim 7 further comprising the step of repeating the step of transmitting said data message at said subscriber preferred send time, when the step of transmitting is unsuccessful.

11. A method as claimed in claim 10 wherein the repeating step further comprises the step of canceling said data message after a pre-determined period of time when the step of transmitting is unsuccessful.

12. A method as claimed in claim 7 further comprising the step of recording a send time for said data message sent at said subscriber preferred send time.

13. A method as claimed in claim 7 wherein the reading step includes reading a destination time zone and wherein the method further comprises the step of determining when said destination time zone is different from originating time zone.

14. A method as claimed in claim 7 further comprising the step of receiving transmittal cost information for said data message for a service area of said communication system in which the subscriber unit operates.

15. A method as claimed in claim 7 further comprising the steps of:

storing said data message in a memory of a subscriber unit; and retrieving said data message from said memory prior to the transmitting step.

16. A subscriber unit that sends a data message comprising:

a transceiver for receiving updates from a communication system, said updates including an optimum time for transmission of data messages;

a memory for storing said data message and a set of personal preferences that indicate whether to transmit said data message at a pre-scheduled time or at said optimum time; and a processor for reading said data message and a set of personal preferences from said memory, wherein said transceiver transmits said data message during said pre-scheduled time or said optimum time depending on said set of personal preferences.

17. A subscriber unit as claimed in claim 16 wherein said updates include an optimum time for each of a plurality of geographic locations served by said communication system, and wherein the subscriber unit further comprises a second memory for storing said updates, and wherein said processor includes means for determining a geographic location of said subscriber unit based on signals provided by said communication system; and means for evaluating said updates to determine said optimum time for said geographic location of said subscriber unit.

18. A subscriber unit as claimed in claim 17 wherein the processor includes means for reading a destination location for said data message, and wherein said means for evaluating includes means for evaluating said updates to determine one of said optimum times for receipt of said data message at said destination location, and wherein the transceiver includes means for transmitting said data message to said destination location at said one of said optimum times.

19. A subscriber unit as claimed in claim 18 wherein said optimum times include most economical times for at least some of said plurality of geographic locations, said most economical times including cost information, and wherein the processor includes means for comparing a most economical time for said destination location and a most economical time for said geographic location of said subscriber unit to determine a lowest cost transmit time, and wherein the transceiver includes means for transmitting said data message at said lowest cost transmit time.

20. A subscriber unit as claimed in claim 17 wherein said data message is associated with a message type, and wherein the subscriber unit further comprises:

means for requesting a communication channel from said communication system;

means for transmitting said message type to said communication system; and means for receiving an assignment of said communication channel, said communication channel having a bandwidth based on said message type, said communication channel assigned by said communication system.

21. A subscriber unit as claimed in claim 20 wherein said communication channel includes a plurality of time slots within time division multiplexed (TDM) frames, and wherein said bandwidth is based on a number of said time-slots of said plurality allocated per each of said TDM frames.

22. A subscriber unit that sends data messages comprising:

a user interface that includes a keypad and display;

a memory for storing operational instructions, said data messages and a set of personal preferences;

a processor for reading said operational instructions from said memory and transferring data to process in conjunction with said user interface for reading a schedule and organizing said data messages by subscriber preferred send times; and a transceiver for receiving updates from a communication system, said updates including low traffic times and most economical times for transmission of said data messages, and transmitting said data messages at one of either said low traffic times, said most economical times, or said subscriber preferred send times depending on said set of personal preferences.

* * * * *